(12) United States Patent
Fukunaga et al.

(10) Patent No.: US 11,209,269 B2
(45) Date of Patent: Dec. 28, 2021

(54) INCLINATION ANGLE DETECTION APPARATUS AND AUTO LEVELIZER

(71) Applicant: Mitsubishi Electric Corporation, Tokyo (JP)

(72) Inventors: Takao Fukunaga, Tokyo (JP); Wataru Tsujita, Tokyo (JP); Tsutomu Asahina, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 334 days.

(21) Appl. No.: 16/331,588

(22) PCT Filed: Oct. 25, 2016

(86) PCT No.: PCT/JP2016/081591
§ 371 (c)(1),
(2) Date: Mar. 8, 2019

(87) PCT Pub. No.: WO2018/078721
PCT Pub. Date: May 3, 2018

(65) Prior Publication Data
US 2019/0241118 A1    Aug. 8, 2019

(51) Int. Cl.
*G01C 9/06* (2006.01)
*B60Q 1/115* (2006.01)
*F21S 41/657* (2018.01)

(52) U.S. Cl.
CPC .............. *G01C 9/06* (2013.01); *B60Q 1/115* (2013.01); *F21S 41/657* (2018.01)

(58) Field of Classification Search
CPC ... B60Q 1/10; B60Q 1/115; G01C 9/06; F21S 41/657
See application file for complete search history.

(56) References Cited

U.S. PATENT DOCUMENTS

| 6,430,521 B1 * | 8/2002 | Toda ...................... B60Q 1/115 362/465 |
| 2012/0002430 A1 | 1/2012 | Yamazaki et al. |
| 2015/0291082 A1 | 10/2015 | Kasaba et al. |

FOREIGN PATENT DOCUMENTS

| JP | 2012-30782 A | 2/2012 |
| JP | 2015-202757 A | 11/2015 |

OTHER PUBLICATIONS

International Search Report (PCT/ISA/210) issued in PCT/JP2016/081591, dated Jan. 24, 2017.

* cited by examiner

*Primary Examiner* — Robert J May
(74) *Attorney, Agent, or Firm* — Birch, Stewart, Kolasch & Birch, LLP

(57) ABSTRACT

Provided are: an inclination angle calculating unit for calculating, when having determined that a vehicle is stationary by referring to vehicle information indicating a traveling state of the vehicle, an inclination angle of the vehicle during a stationary period using inclination angle information indicating an inclination angle of the vehicle and determining a vehicle inclination angle during the stationary period from the calculated inclination angle of the vehicle; and a correction determination processing unit for determining whether an absolute value of a difference between the determined vehicle inclination angle and a reference angle determined previously by the inclination angle calculating unit is less than a first threshold value (threshold value α) and, if the absolute value of the difference is less than the first threshold value (threshold value α), performing a correction to rewrite the vehicle inclination angle to the reference angle.

8 Claims, 10 Drawing Sheets

INCLINATION ANGLE DETECTION APPARATUS AND AUTO LEVELIZER

TECHNICAL FIELD

The present disclosure relates to technology of detecting an inclination angle of a vehicle for controlling the optical axis of the headlights of the vehicle.

BACKGROUND ART

An illumination range of headlights of a vehicle varies in accordance with the inclination of the vehicle caused by a person getting in or off, loading or unloading a luggage, or the like. To avoid dazzling pedestrians or oncoming vehicles and to secure safety ahead of the driver, it is obligatory to install, to the headlights of a vehicle, an inclination angle detection apparatus for automatically adjusting the illumination range in accordance with a tilted posture of the vehicle.

In inclination angle detection apparatuses, an inclination of a vehicle is detected by a sensor, and the optical axis of headlights is controlled in accordance with the detected inclination of the vehicle. The detection result of the inclination of the vehicle is superimposed with noise due to vibration of a mechanism, such as suspension, gear, or the engine of the vehicle. For this reason, there is a problem in that noises accumulate to cause the detection result of the inclination of the vehicle to deviate from the correct inclination angle of the vehicle even when a person of the same weight gets in or off or luggage of the same weight is loaded or unloaded.

In order to solve this problem, in a control device for a vehicle lamp disclosed in Patent Literature 1, when a non-static load change occurs due to a shift in at least one of a foot brake, a parking brake, and a shift position, a signal indicating that the non-static load change has occurred is output, and in the case where the signal is received, it is determined that the change is not caused by an inclination angle of the vehicle, thereby avoiding a displacement in the optical axis angle. This suppresses a deviation in the optical axis position that occurs when optical axis adjustment is performed on the non-static load change, which is to be excluded from objects of the optical axis adjustment.

CITATION LIST

Patent Literature

Patent Literature 1: JP 2015-202757 A

SUMMARY OF INVENTION

Technical Problem

In the control device for a vehicle lamp described in Patent Literature 1, there is a problem in that, although it is possible to avoid detection errors in the inclination angle of the vehicle caused by vibrations, it is not possible to suppress detection errors in the inclination angle of the vehicle that are caused by accumulation of noise due to mechanisms of the vehicle when there is a large change in the load by a person getting in or off, luggage loaded or unloaded, or the like.

Embodiments of the present disclosure have been made to solve the problems above, and it is an object of the embodiments to suppress detection errors in the inclination angle of a vehicle that are caused by accumulation of noise due to mechanisms of the vehicle when there is a change in load.

Solution to Problem

An inclination angle detection apparatus according to the present disclosure includes: an inclination angle calculating unit for calculating, when having determined that a vehicle is stationary by referring to vehicle information indicating a traveling state of the vehicle, an inclination angle of the vehicle during a stationary period using inclination angle information indicating an inclination angle of the vehicle, and determining a vehicle inclination angle during the stationary period from the calculated inclination angle of the vehicle; and a correction determination processing unit for determining whether an absolute value of a difference between the vehicle inclination angle determined by the inclination angle calculating unit and a reference angle determined previously by the inclination angle calculating unit is less than a first threshold value and, if the absolute value of the difference is less than the first threshold value, performing a correction to rewrite the vehicle inclination angle to the reference angle.

Advantageous Effects of Invention

According to an aspect of the embodiments, it is possible to suppress detection errors in the inclination angle of a vehicle that are caused by accumulation of noise due to mechanisms of the vehicle when there is a variation in load.

DESCRIPTION OF EMBODIMENTS

To describe the present disclosure further in detail, embodiments for carrying out the present invention will be described below with reference to the accompanying drawings.

Embodiment 1

Figure 1:
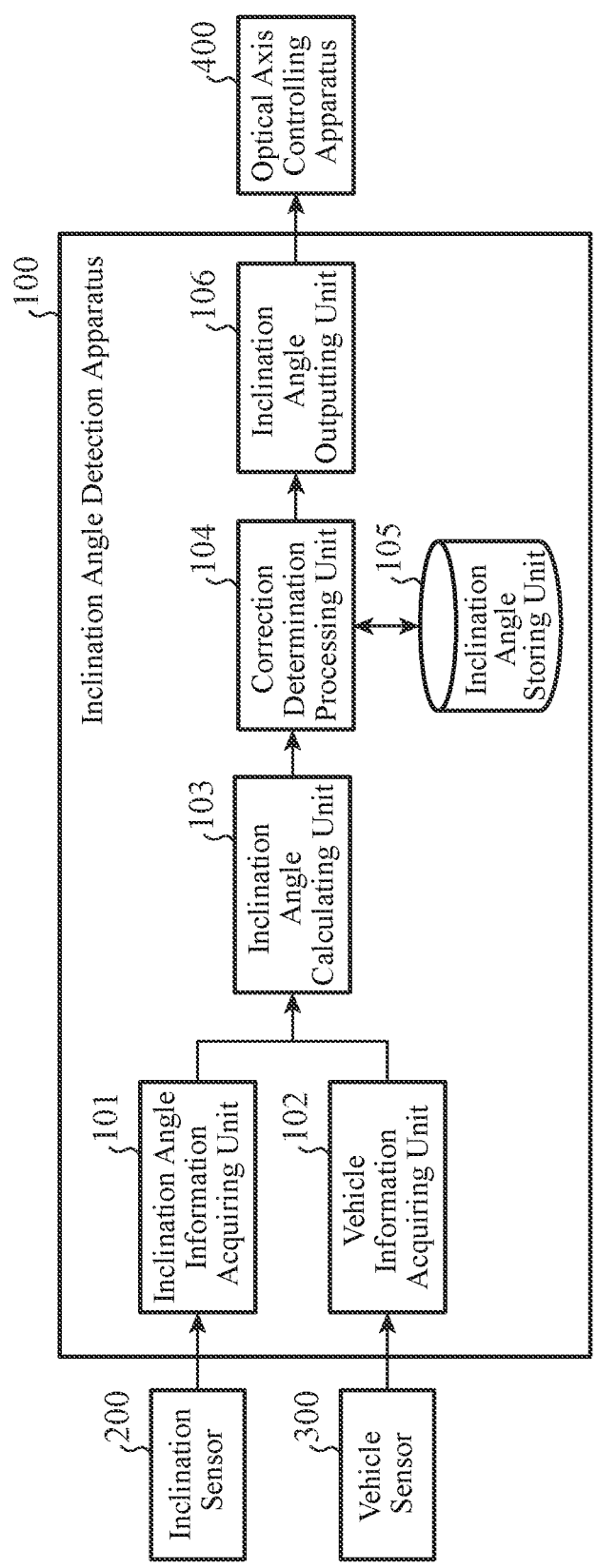
FIG. 1 is a block diagram illustrating a configuration of an inclination angle detection apparatus according to Embodiment 1.

FIG. 1 is a block diagram illustrating a configuration of an inclination angle detection apparatus according to Embodiment 1.

The inclination angle detection apparatus 100 includes an inclination angle information acquiring unit 101, a vehicle information acquiring unit 102, an inclination angle calculating unit 103, a correction determination processing unit 104, an inclination angle storing unit 105, and an inclination angle outputting unit 106.

The inclination angle information acquiring unit 101 acquires an inclination angle of a vehicle measured by an inclination sensor 200 mounted on the vehicle and outputs inclination angle information to the inclination angle calculating unit 103. In the case where a plurality of inclination sensors 200 is arranged in the vehicle, a plurality of inclination angles is collectively output as the inclination angle information to the inclination angle calculating unit 103.

The vehicle information acquiring unit 102 acquires information indicating the traveling state of the vehicle from a vehicle sensor 300 mounted on the vehicle and outputs vehicle information to the inclination angle calculating unit 103. The information indicating the traveling state of the vehicle includes at least information that allows for determination whether the vehicle is traveling or stationary. More specifically, the information indicating the traveling state of the vehicle is information that indicates a state in which a person can get in or off or luggage can be loaded or unloaded, such as a state in which the engine of the vehicle is caused to stop or the side brake of the vehicle is on.

The inclination angle calculating unit 103 refers to the traveling state of the vehicle input from the vehicle information acquiring unit 102 and determines whether the vehicle is stationary. If the inclination angle calculating unit 103 determines that the vehicle is stationary, then it calculates the inclination angle of the vehicle by using the inclination angle information input from the inclination angle information acquiring unit 101. The inclination angle calculating unit 103 calculates the inclination angle of the vehicle continuously while the vehicle is stationary. If the stationary state of the vehicle is canceled, then the inclination angle calculating unit 103 determines the inclination angle of the vehicle calculated immediately before the cancellation as a vehicle inclination angle θnew. Here, other than the inclination angle of the vehicle calculated immediately before the cancellation of the stationary state of the vehicle, in the case in which a person has gotten in or off or luggage has been loaded or unloaded and in which there is a point where the inclination angle of the vehicle can be stably acquired, the inclination angle calculating unit 103 may determine the vehicle inclination angle θnew by using the inclination angle at the point. The inclination angle calculating unit 103 outputs the inclination angles of the vehicle calculated during the period while the vehicle is stationary and the determined vehicle inclination angle θnew to the correction determination processing unit 104.

The correction determination processing unit 104 determines whether to correct the vehicle inclination angle θnew by comparing the vehicle inclination angle θnew input from the inclination angle calculating unit 103 and a reference angle θmem prestored in the inclination angle storing unit 105. If the correction determination processing unit 104 determines to correct the vehicle inclination angle θnew, then it performs a correction to rewrite the vehicle inclination angle θnew with the reference angle θmem and outputs a corrected vehicle inclination angle θnew to the inclination angle outputting unit 106. On the other hand, if the correction determination processing unit 104 determines not to correct the vehicle inclination angle θnew, it outputs the vehicle inclination angle θnew to the inclination angle outputting unit 106 as it is.

In addition, the correction determination processing unit 104 refers to the inclination angles of the vehicle calculated during the period when the vehicle has been stationary and determines a reference angle θmem to be stored in the inclination angle storing unit 105. The correction determination processing unit 104 updates the information stored in the inclination angle storing unit 105 by using the determined reference angle θmem. The inclination angle storing unit 105 stores the reference angle θmem determined by the correction determination processing unit 104. The inclination angle outputting unit 106 outputs the vehicle inclination angle input from the correction determination processing unit 104 as the current vehicle inclination angle to, for example, an optical axis controlling apparatus 400 or other devices mounted in the vehicle.

As illustrated in FIG. 1, the inclination sensor 200, the vehicle sensor 300, and the optical axis controlling apparatus 400 are connected to the inclination angle detection apparatus 100.

The inclination sensor 200 is mounted on the vehicle and detects the inclination angle of the vehicle with respect to a road surface.

The vehicle sensor 300 is a vehicle speed sensor, a brake sensor, or other sensors mounted on the vehicle and detects information indicating the traveling state of the vehicle.

The optical axis controlling apparatus 400 is mounted on the vehicle and controls the angles of the optical axes of the headlights of the vehicle on the basis of the vehicle inclination angle output from the inclination angle outputting unit 106 of the inclination angle detection apparatus 100. The inclination angle detection apparatus 100 and the optical axis controlling apparatus 400 compose an auto levelizer.

Next, an exemplary hardware configuration of the inclination angle detection apparatus 100 will be described.

Figure 2A:
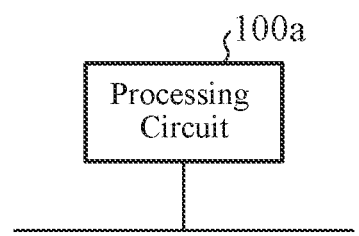
FIG. 2A and FIG. 2B are diagrams illustrating exemplary hardware configurations of the inclination angle detection apparatus according to Embodiment 1.
Figure 2B:
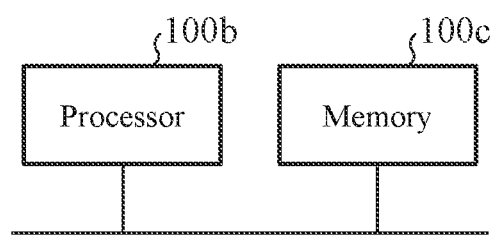

FIG. 2A and FIG. 2B are diagrams illustrating exemplary hardware configurations of the inclination angle detection apparatus 100 according to Embodiment 1.

The inclination angle information acquiring unit 101, the vehicle information acquiring unit 102, the inclination angle calculating unit 103, the correction determination processing unit 104, and the inclination angle outputting unit 106 in the inclination angle detection apparatus 100 may be implemented by a processing circuit 100a which is dedicated hardware as illustrated in FIG. 2A, or may be implemented by a processor 100b which executes a program stored in a memory 100c as illustrated in FIG. 2B.

In the case where the inclination angle information acquiring unit 101, the vehicle information acquiring unit 102, the inclination angle calculating unit 103, the correction determination processing unit 104, and the inclination angle outputting unit 106 are implemented by dedicated hardware as illustrated in FIG. 2A, the processing circuit 100a corresponds to, for example, a single circuit, a composite circuit, a programmed processor, a parallel-programmed processor, an application specific integrated circuit (ASIC), a field-programmable gate array (FPGA), or a combination thereof. The functions of the respective units of the inclination angle information acquiring unit 101, the vehicle information acquiring unit 102, the inclination angle calculating unit 103, the correction determination processing unit 104, and the inclination angle outputting unit 106 may be separately implemented by processing circuits, or the functions of the respective units may be collectively implemented by one processing circuit.

As illustrated in FIG. 2B, in the case where the inclination angle information acquiring unit 101, the vehicle information acquiring unit 102, the inclination angle calculating unit 103, the correction determination processing unit 104, and the inclination angle outputting unit 106 are implemented by the processor 100b, the functions of the respective units are implemented by software, firmware, or a combination of software and firmware. Software and firmware are described as a program, which is stored in the memory 100c. By reading out and executing the program stored in the memory 100c, the processor 100b implements the functions of the inclination angle information acquiring unit 101, the vehicle information acquiring unit 102, the inclination angle calculating unit 103, the correction determination processing unit 104, and the inclination angle outputting unit 106. That is, the inclination angle information acquiring unit 101, the vehicle information acquiring unit 102, the inclination angle calculating unit 103, the correction determination processing unit 104, and the inclination angle outputting unit 106 have the memory 100c for storing a program execution of which by the processor 100b results in execution of steps illustrated in FIGS. 3 and 5, which will be described later. It can also be stated that these programs cause the computer to execute procedures or methods of the inclination angle information acquiring unit 101, the vehicle information acquiring unit 102, the inclination angle calculating unit 103, the correction determination processing unit 104, and the inclination angle outputting unit 106.

Here, the processor 100b is, for example, a central processing unit (CPU), a processing device, an arithmetic device, a processor, a microprocessor, a microcomputer, a digital signal processor (DSP), or the like.

The memory 100c may be a nonvolatile or volatile semiconductor memory such as a random access memory (RAM), a read only memory (ROM), a flash memory, an erasable programmable ROM (EPROM), an electrically EPROM (EEPROM), a magnetic disk such as a hard disk or a flexible disk, or an optical disc such as a mini disc, a compact disc (CD) or a digital versatile disc (DVD).

Note that part of the functions of the inclination angle information acquiring unit 101, the vehicle information acquiring unit 102, the inclination angle calculating unit 103, the correction determination processing unit 104, and the inclination angle outputting unit 106 may be implemented by dedicated hardware with another part implemented by software or firmware. In this manner, the processing circuit 100a in the inclination angle detection apparatus 100 can implement the above functions by hardware, software, firmware, or a combination thereof.

Next, the operation of the inclination angle detection apparatus 100 will be described.

Figure 3:
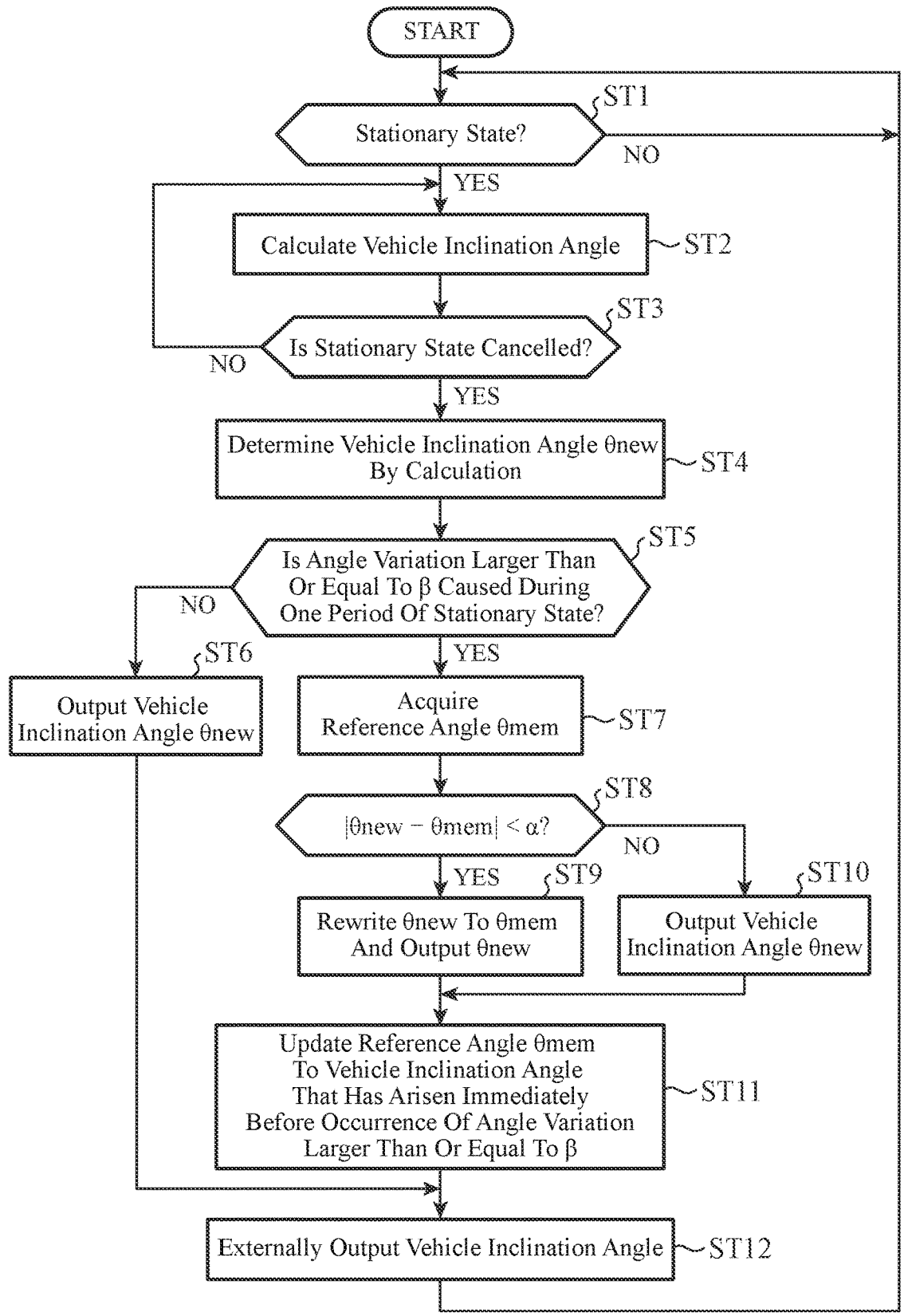
FIG. 3 is a flowchart illustrating the operation of the inclination angle detection apparatus according to Embodiment 1.

FIG. 3 is a flowchart illustrating the operation of the inclination angle detection apparatus 100 according to Embodiment 1.

In the following description, out of the cases where a person gets in or off or luggage is loaded or unloaded, which affect the inclination angle of the vehicle with respect to a road surface, the case where a person gets in or off will be described as an example. Furthermore, it is assumed that the inclination angle information acquiring unit 101 acquires, from the inclination sensor 200, inclination angles of the vehicle with respect to a road surface detected at preset intervals by the inclination sensor 200. It is assumed that the vehicle information acquiring unit 102 constantly acquires information indicating the traveling state of the vehicle detected by the vehicle sensor 300.

When the vehicle information is input from the vehicle information acquiring unit 102, the inclination angle calculating unit 103 refers to the vehicle information and determines whether the vehicle is stationary (step ST1). If the vehicle is not stationary (step ST1; NO), then the inclination angle calculating unit 103 repeats the determination processing of step ST1. On the other hand, if the vehicle is stationary (step ST1; YES), then the inclination angle calculating unit 103 calculates the inclination angle of the vehicle by referring to the inclination angle information input from the inclination angle information acquiring unit 101 (step ST2).

The inclination angle calculating unit 103 refers to the vehicle information input from the vehicle information acquiring unit 102 and determines whether the stationary state of the vehicle is canceled (step ST3). If the stationary state of the vehicle is not canceled (step ST3; NO), then the calculation processing of step ST2 is repeated. On the other hand, if the stationary state of the vehicle is canceled (step ST3; YES), then the inclination angle calculating unit 103 determines the vehicle inclination angle θnew from the inclination angles of the vehicle obtained from the calculation in step ST2 (step ST4). In step ST4, the inclination angle calculating unit 103 determines, as the vehicle inclination angle θnew, the inclination angle of the vehicle calculated in step ST2 immediately before the determination that the stationary state of the vehicle is canceled in step ST3. The inclination angle calculating unit 103 outputs the inclination angles of the vehicle obtained from the calculation processing of step ST2 during one period of time in which the vehicle is stationary and the vehicle inclination angle θnew determined in step ST4, to the correction determination processing unit 104.

The correction determination processing unit 104 refers to the inclination angles of the vehicle obtained from the calculation processing during the one period of time in which the vehicle has been stationary and determines whether an angular variation larger than or equal to a preset threshold value β (second threshold value) has occurred (step ST5). If no angular variation larger than or equal to the threshold value β has occurred (step ST5; NO), then the correction determination processing unit 104 determines that there has been no person getting in or off the vehicle and outputs the vehicle inclination angle θnew determined in step ST4 to the inclination angle outputting unit 106 (step ST6).

On the other hand, if an angular variation larger than or equal to the threshold value β has occurred (step ST5; YES), then the correction determination processing unit 104 determines that there has been a person getting in or off the vehicle and acquires the stored reference angle θmem from the inclination angle storing unit 105 (step ST7). The correction determination processing unit 104 determines whether an absolute value of a difference between the vehicle inclination angle θnew determined in step ST4 and the reference angle θmem acquired in step ST7 is less than a threshold value α (first threshold value) (step ST8).

If the absolute value of the difference between the vehicle inclination angle θnew and the reference angle θmem is less than the threshold value α (step ST8; YES), then the correction determination processing unit 104 assumes that a passenger, having the same weight as that of a passenger in a previous stationary state, has gotten in or off and performs correction to rewrite the vehicle inclination angle θnew to the reference angle θmem, and outputs the corrected vehicle inclination angle to the inclination angle outputting unit 106 (step ST9). In step ST9, by assuming that the passenger, having the same weight as that of the passenger in the previous stationary state, has gotten in or off, it is determined that the difference between the vehicle inclination angle θnew and the reference angle θmem is an error of the inclination sensor 200, and correction to rewrite using the reference angle θmem stored in the previous stationary state is performed.

On the other hand, if the absolute value of the difference between the vehicle inclination angle θnew and the reference angle θmem is larger than or equal to the threshold value α (step ST8; NO), then the correction determination processing unit 104 assumes that a passenger, having a different weight from that of the passenger in the previous stationary state, has gotten in or off and outputs the vehicle inclination angle θnew determined in step ST4 to the inclination angle outputting unit 106 (step ST10).

The above-mentioned threshold value (is set to a value that allows for detection of a load variation when a person gets in or off the vehicle or luggage is loaded and unloaded. For example, suppose that the threshold value (is set to a value that allows for detection of a variation of 0.2 degrees corresponding to an angular variation of the vehicle when one passenger gets in or off the vehicle. In this example, the threshold value α is set to a value that allows for detection of an angular variation of the vehicle of 0.02 degrees which is one tenth of the threshold value β, for example. The threshold value α and the threshold value β are set on the basis of a type or other items of the vehicle. Meanwhile, the specific values of the threshold value α and the threshold value β described above are merely examples, and thus the threshold values are not limited to the above-mentioned values.

When the processing of step ST9 or step ST10 is completed, the correction determination processing unit 104 refers to the inclination angles of the vehicle obtained from the calculation processing during the one period of time in which the vehicle is stationary and updates the reference angle θmem stored in the inclination angle storing unit 105 by using the vehicle inclination angle that has arisen immediately before the occurrence of the angular variation larger than or equal to the preset threshold value β (step ST11).

The inclination angle outputting unit 106 outputs the reference angle θmem or the vehicle inclination angle θnew input in step ST9 or step ST10 to the optical axis controlling apparatus 400 (step ST12). Thereafter, the flowchart returns to the processing of step ST1 and the processing described above is repeated.

The processing operation illustrated in the flowchart of FIG. 3 will be described with reference to a specific example of FIG. 4.

Figure 4:
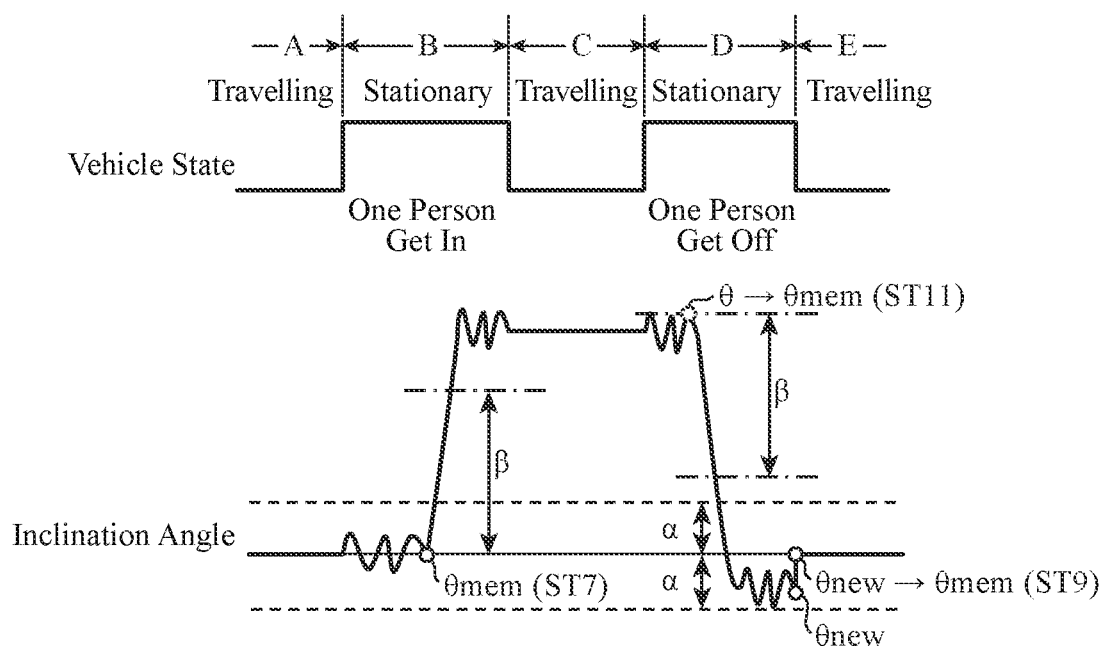
FIG. 4 is a diagram illustrating an example of processing of the inclination angle detection apparatus according to Embodiment 1.

FIG. 4 is a diagram illustrating vehicle information and the inclination angle of the vehicle acquired by the inclination angle detection apparatus 100 according to Embodiment 1.

The vehicle information indicates that the vehicle has experienced a travel through a travel period A, a stationary period B, a travel period C, a stationary period D, and a travel period E. It is also indicated that one person gets in the stationary period B and that one person gets off in the stationary period D.

Hereinafter, the case where the processing illustrated in the flowchart of FIG. 3 is performed for the stationary period D of FIG. 4 will be described. It is assumed that, in the inclination angle storing unit 105, an inclination angle of the vehicle that has arisen immediately before an occurrence of an angular variation larger than or equal to the threshold value β in the previous stationary period B is stored as the reference angle θmem.

In step ST1, the inclination angle calculating unit 103 determines that the vehicle is stationary (step ST1; YES), and repeats calculation of the inclination angle of the vehicle during the stationary period D in step ST2. After transition to the travel period E, the inclination angle calculating unit 103 determines that the stationary state of the vehicle is canceled in step ST3 (step ST3; YES) and determines, as the vehicle inclination angle θnew, an inclination angle of the vehicle that has arisen immediately before the determination that the stationary state is canceled in step ST4.

The correction determination processing unit 104 refers to the inclination angles of the vehicle obtained from the calculation processing during the stationary period D in step ST5 and determines that an angular variation larger than or equal to the threshold value α has occurred (step ST5; YES). The correction determination processing unit 104 acquires the reference angle θmem stored in the inclination angle storing unit 105 in step ST7. In step ST8, the correction determination processing unit 104 determines that an absolute value of a difference between the vehicle inclination angle θnew and the acquired reference angle θmem is less than the threshold value α (step ST8; YES). The correction determination processing unit 104 performs correction to rewrite the vehicle inclination angle θnew to the reference angle θmem in step ST9 (see the description of θnew→θmem at the boundary between the stationary period D and the travel period E in FIG. 4).

The correction determination processing unit 104 outputs the corrected vehicle inclination angle (θmem at the boundary between the stationary period D and the travel period E in FIG. 4) to the inclination angle outputting unit 106 in step ST10. The correction determination processing unit 104 updates the reference angle θmem stored in the inclination angle storing unit 105 by using an inclination angle θ of the vehicle that has arisen immediately before occurrence of the angular variation larger than or equal to the threshold value β in the stationary period D in step ST11 (see description of θ->θmem in FIG. 4). The inclination angle outputting unit 106 outputs the corrected vehicle inclination angle to the optical axis controlling apparatus 400 in step ST12.

In the above-described FIGS. 3 and 4, the configuration in which the inclination angle storing unit 105 stores, as the reference angle θmem, the inclination angle that has arisen immediately before an occurrence of the angular variation larger than or equal to the threshold value β in the stationary period has been described. Meanwhile, in the following description, a configuration is illustrated in which the inclination angle storing unit 105 stores a plurality of reference angles of θmem in a plurality of stationary periods in which an angular variation larger than or equal to the threshold value (has occurred. Described is processing in which the correction determination processing unit 104 performs determination by referring to a plurality of reference angles of θmem.

The correction determination processing unit 104 sets a reference angle θmemN (N=1, 2, 3, . . . ) by using an inclination angle θ of the vehicle that is obtained before an occurrence of a variation larger than or equal to the threshold value β each time it is determined that an angular variation larger than or equal to the threshold value β occurs in a stationary period, and stores the reference angle θmemN in the inclination angle storing unit 105. The correction determination processing unit 104 sequentially compares a determined vehicle inclination angle θnew with the plurality of reference angles of θmemN stored in the inclination angle storing unit 105.

Any method can be applied as the method for the correction determination processing unit 104 to store the new reference angles of θmemN in the inclination angle storing unit 105. For example, the correction determination processing unit 104 overwrites the oldest reference angle θmemN stored in the inclination angle storing unit 105 with the newly set reference angle θmemN, or overwrites a reference angle θmemN having a value closer to the newly set reference angle θmemN with the newly set reference angle θmemN.

Figure 5:
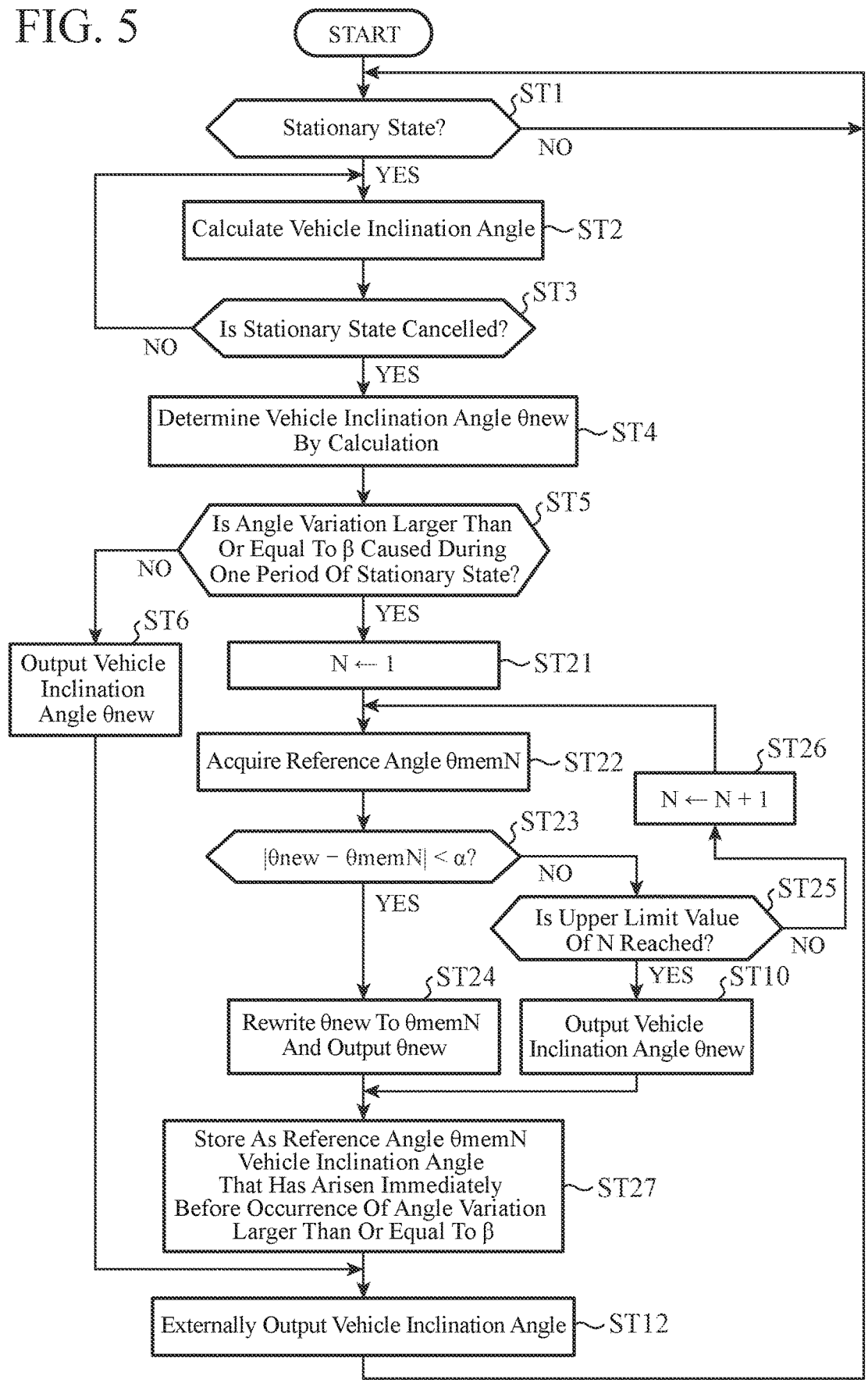
FIG. 5 is a flowchart illustrating another operation of the inclination angle detection apparatus according to Embodiment 1.

FIG. 5 is a flowchart illustrating another processing operation of the inclination angle detection apparatus 100 according to Embodiment 1. Note that the same step as that in the processing operation of the inclination angle detection apparatus 100 illustrated in FIG. 3 is denoted by the same reference numeral as that used in FIG. 3, and the description thereof will be omitted or simplified.

If it is determined that no angular variation larger than or equal to the threshold value (has occurred (step ST5; NO) in the processing of step ST5, then the flow proceeds to the processing of step ST6.

On the other hand, if it is determined that an angular variation larger than or equal to the threshold value β has occurred (step ST5; YES), then the correction determination processing unit 104 determines that a person has gotten in or off the vehicle and performs setting of N=1 for the reference angle θmemN stored in the inclination angle storing unit 105 (step ST21). The correction determination processing unit 104 acquires the set reference angle θmemN from the inclination angle storing unit 105 (step ST22). The correction determination processing unit 104 determines whether an absolute value of a difference between the vehicle inclination angle θnew determined in step ST4 and the reference angle θmemN acquired in step ST22 is less than the threshold value α (step ST23).

If the absolute value of the difference between the vehicle inclination angle θnew and the reference angle θmemN is less than the threshold value α (step ST23; YES), then the correction determination processing unit 104 assumes that a passenger, having the same weight as that of a passenger in a previous stationary state, has gotten in or off and performs a correction to rewrite the vehicle inclination angle θnew to the reference angle θmemN, and outputs the corrected vehicle inclination angle to the inclination angle outputting unit 106 (step ST24). In step ST24, by assuming that the passenger, having the same weight as that of the passenger in the previous stationary state, has gotten in or off, it is determined that the difference between the vehicle inclination angle θnew and the reference angle θmem is an error of the inclination sensor 200, and a correction to rewrite using the accumulated reference angle θmemN is performed.

On the other hand, if the absolute value of the difference between the vehicle inclination angle θnew and the reference angle θmem is greater than or equal to the threshold value α (step ST23; NO), then the correction determination processing unit 104 determines whether the current value of N of the reference angle θmemN has reached a preset upper limit value (step ST25). If the value of N has not reached the upper limit value (step ST25; NO), then the correction determination processing unit 104 adds "1" to the current value of N of the reference angle θmemN (step ST26) and returns to the processing of step ST22. On the other hand, if the value of N has reached the upper limit value (step ST25; YES), then the flow proceeds to processing of step ST10. Here, the upper limit value of N is set on the basis of the number of reference angles of θmemN stored in the inclination angle storing unit 105.

Furthermore, the correction determination processing unit 104 refers to inclination angles of the vehicle obtained by the calculation processing during the current one period of stationary time of the vehicle in the inclination angle calculating unit 103, and stores an inclination angle of the vehicle that has arisen immediately before an occurrence of an angular variation larger than or equal to the preset threshold value β in the inclination angle storing unit 105 as a new reference angle θmemN (step ST27). The inclination angle outputting unit 106 outputs the vehicle inclination angle input in step ST24 or step ST10 to the optical axis controlling apparatus 400 (step ST12). Thereafter, the flowchart returns to the processing of step ST1 and the processing described above is repeated.

The processing operation illustrated in the flowchart of FIG. 5 will be described with reference to a specific example of FIG. 6.

Figure 6:
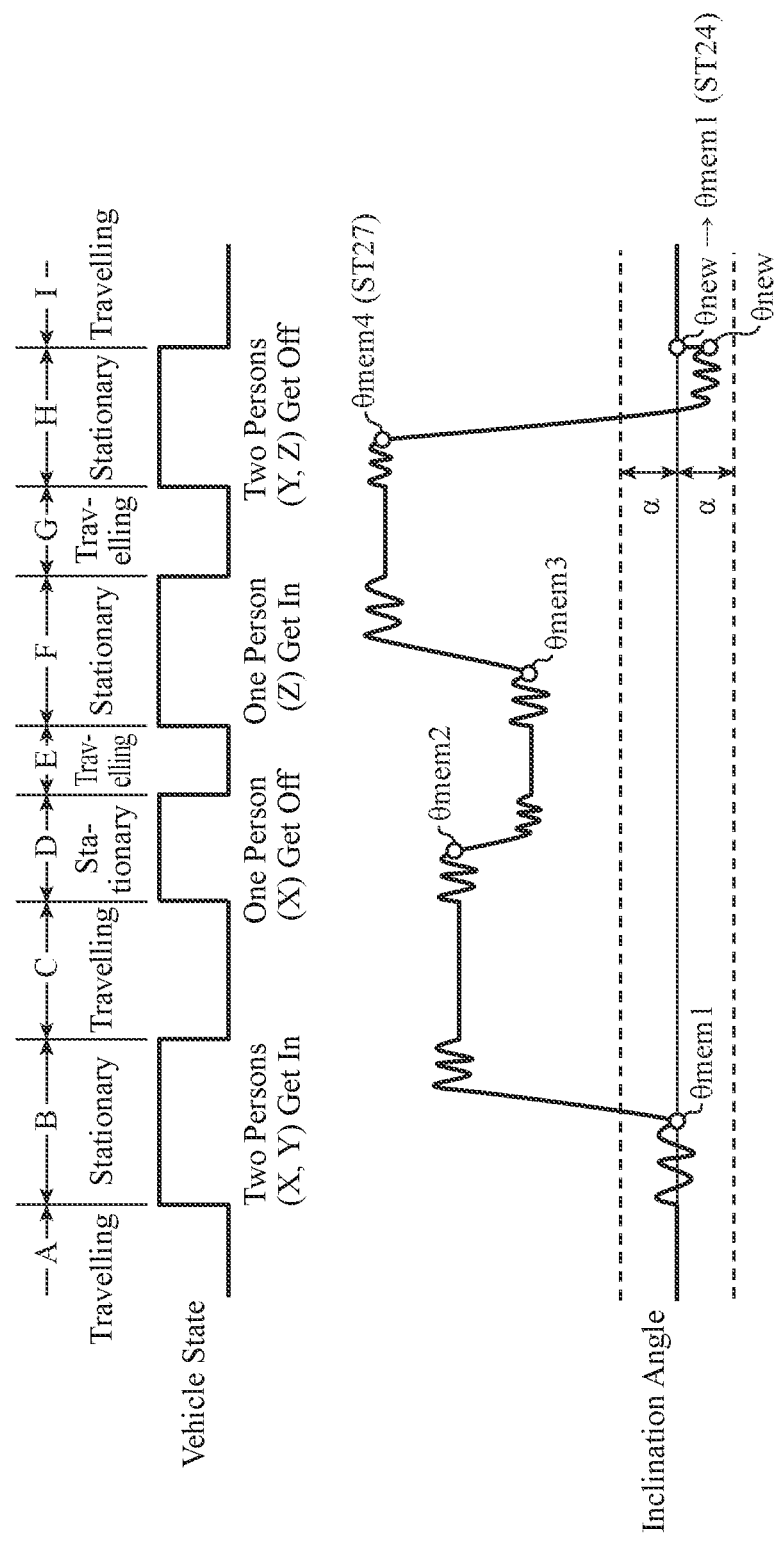
FIG. 6 is a diagram illustrating an example of another processing of the inclination angle detection apparatus according to Embodiment 1.

FIG. 6 is a diagram illustrating variations in the vehicle state and the inclination angle of the vehicle acquired by the inclination angle detection apparatus 100 according to Embodiment 1.

The vehicle information indicates that the vehicle has experienced a travel through a travel period A, a stationary period B, . . . , a stationary period H, and a travel period I. Also indicated are that X and Y have gotten in the stationary period B, that X has gotten off in the stationary period D, that Z has gotten in in the stationary period F, and that Y and Z have gotten off in the stationary period H.

Hereinafter, the case where the processing illustrated in the flowchart of FIG. 5 is performed for the stationary period H of FIG. 6 will be described. It is assumed that, in the inclination angle storing unit 105, inclination angles of the vehicle that have arisen immediately before an occurrence of an angular variation larger than or equal to the threshold value β in each of the stationary period B, the stationary period D, and the stationary period F are stored as a reference angle θmem1, a reference angle θmem2, and a reference angle θmem3. Note that description of the threshold value β is omitted in FIG. 6.

In step ST1, the inclination angle calculating unit 103 determines that the vehicle is stationary (step ST1; YES), and repeats calculation of the inclination angle of the vehicle during the stationary period H in step ST2. After transition to the travel period I, the inclination angle calculating unit 103 determines that the stationary state of the vehicle has been canceled in step ST3 (step ST3; YES) and determines, as the vehicle inclination angle θnew, an inclination angle of the vehicle that has arisen immediately before the determination that the stationary state has been canceled in step ST4.

The correction determination processing unit 104 refers to the inclination angle of the vehicle obtained from the calculation processing during the stationary period H in step ST5 and determines that an angular variation of the vehicle larger than or equal to the threshold value β has occurred (step ST5; YES). The correction determination processing unit 104 performs setting of N=1 for the reference angle θmemN in step ST21. The correction determination processing unit 104 acquires the reference angle θmem1 stored in the inclination angle storing unit 105 in step ST22. In step ST23, the correction determination processing unit 104 determines that an absolute value of a difference between the vehicle inclination angle θnew and the reference angle θmem1 is less than the threshold value α (step ST23; YES).

The correction determination processing unit 104 performs a correction to rewrite the vehicle inclination angle θnew to the reference angle θmem1 in step ST24 (see the description of θnew→θmem1 at the boundary between the stationary period H and the travel period I in FIG. 6). In addition, the correction determination processing unit 104 outputs the corrected vehicle inclination angle (θmem1) to the inclination angle outputting unit 106 in step ST24. The correction determination processing unit 104 stores, in the inclination angle storing unit 105 as a reference angle θmem4, an inclination angle θ of the vehicle that has arisen immediately before occurrence of an angular variation larger than or equal to the threshold value β in the stationary period H in step ST27 (see description of θ→θmem4 in FIG. 4). The inclination angle outputting unit 106 outputs the corrected vehicle inclination angle (θmem1) to the optical axis controlling apparatus 400 in step ST12.

As described above, according to Embodiment 1, it is configured to include: the inclination angle calculating unit 103 for calculating, when having determined that a vehicle is stationary by referring to vehicle information indicating a traveling state of the vehicle, an inclination angle of the vehicle during a stationary period using inclination angle information indicating an inclination angle of the vehicle and determining a vehicle inclination angle θnew during the stationary period from the calculated inclination angle of the vehicle; and the correction determination processing unit 104 for determining whether an absolute value of a difference between the calculated vehicle inclination angle θnew and a reference angle θmem determined previously by the inclination angle calculating unit 103 is less than a first threshold value (threshold value α) and, if the absolute value of the difference is less than the first threshold value (threshold value α), performing a correction to rewrite the vehicle inclination angle θnew to the reference angle θmem. Therefore, it is possible to suppress detection errors in the inclination angle of the vehicle that are caused by accumulation of noise due to mechanisms of the vehicle when there is a change in the load due to a person getting in or off, luggage loaded or unloaded, etc.

In addition, according to Embodiment 1, the correction determination processing unit 104 performs determination as to whether a difference between the vehicle inclination angle θnew and the reference angle θmem is less than the first threshold value (threshold value α) in the case where an angular variation larger than or equal to the second threshold value (threshold value β) has occurred in the inclination angle of the vehicle calculated by the inclination angle calculating unit 103 within one stationary period of the vehicle. Therefore, it is possible to suppress the number of times of rewriting the vehicle inclination angle θnew and to reduce the load of the calculation processing of the inclination angle detection apparatus 100.

In addition, according to Embodiment 1, in the case where inclination angles of the vehicle calculated by the inclination angle calculating unit 103 within one stationary period of the vehicle include an angular variation greater than or equal to the second threshold value (threshold value β), the correction determination processing unit 104 accumulates an inclination angle of the vehicle immediately before the occurrence of the angular variation greater than or equal to the second threshold value (threshold value β) as a reference angle. Therefore, it is possible to suppress accumulation of noise due to mechanisms of the vehicle when there is a change in the load due to a person getting in or off, luggage loaded or unloaded, etc.

Embodiment 2

In Embodiment 2, the number of times of getting in or off of one or more persons and loading and unloading of luggage is stored, and the above-described threshold value α is updated in accordance with the stored number of times.

When boarding and alighting of persons and loading and unloading of luggage are repeated without rewriting the inclination angle, errors of the inclination sensor 200 accumulate and therefore the accumulated error may exceed the set threshold value α always. Accordingly, in order to suppress the state of the accumulated error of the inclination sensor 200 constantly exceeding the threshold value α, an inclination angle detection apparatus 100A of Embodiment 2 updates the threshold value α in accordance with the number of times persons getting in or off or luggage loaded and unloaded (hereinafter referred to as the number of times of boarding/alighting, s).

Figure 7:
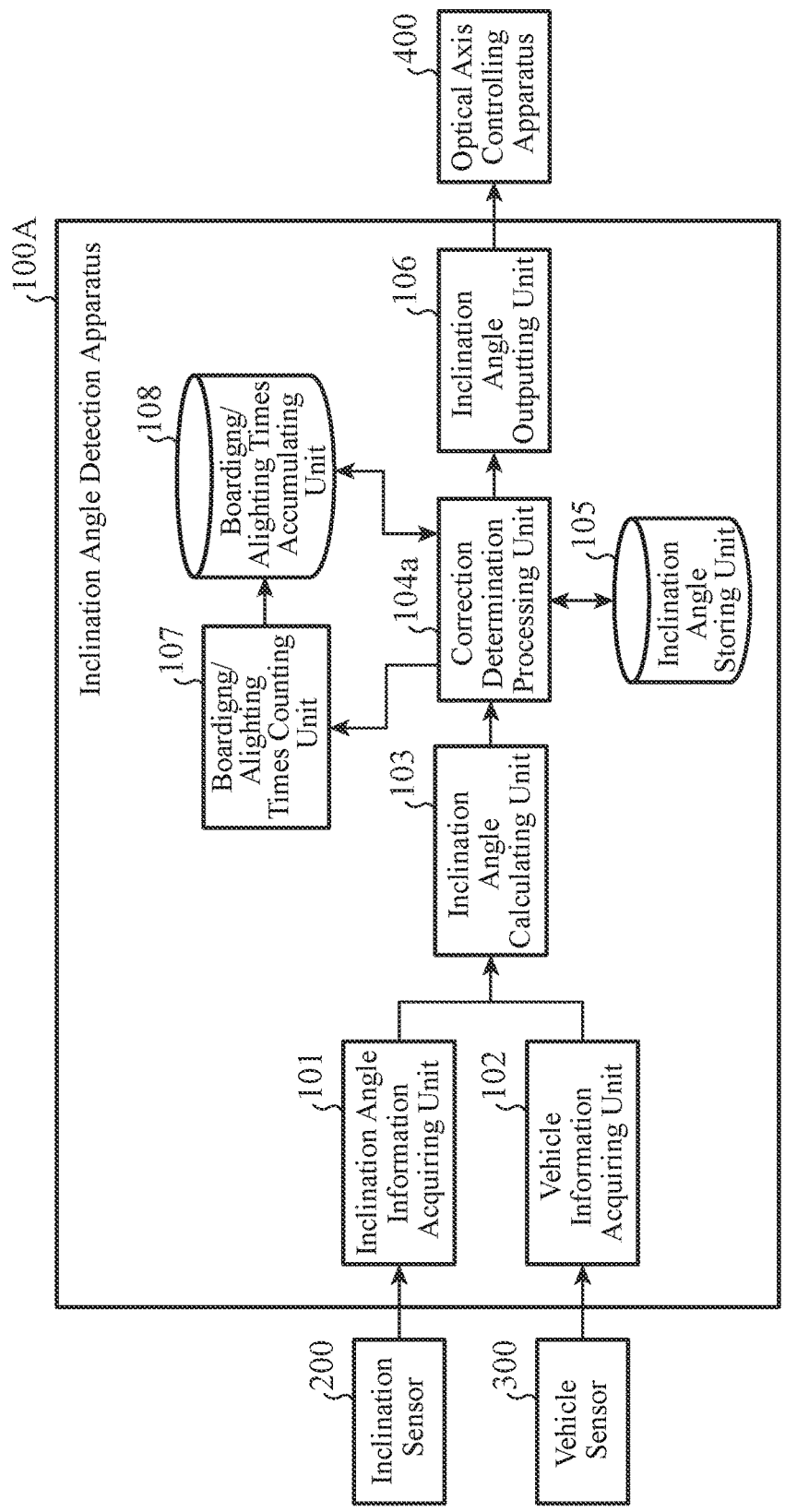
FIG. 7 is a block diagram illustrating a configuration of an inclination angle detection apparatus according to Embodiment 2.

FIG. 7 is a block diagram illustrating a configuration of the inclination angle detection apparatus 100A according to Embodiment 2.

The inclination angle detection apparatus 100A according to Embodiment 2 is configured to further include a boarding/alighting times counting unit 107 and a boarding/alighting times accumulating unit 108 in addition to the inclination angle detection apparatus 100 described in Embodiment 1. Furthermore, the inclination angle detection apparatus 100A includes a correction determination processing unit 104a in place of the correction determination processing unit 104 described in Embodiment 1.

In the following description, the same symbol as that used in Embodiment 1 is provided to the same or a corresponding component as that of the inclination angle detection apparatus 100 according to Embodiment 1, and the explanation thereof is omitted or simplified.

The boarding/alighting times counting unit 107 refers to an inclination angle of a vehicle calculated by an inclination angle calculating unit 103 and counts the number of times of an occurrence of a variation in load on the vehicle. Specifically, when having determined that an angular variation larger than or equal to a preset threshold value β has occurred in the calculated inclination angle of the vehicle, the boarding/alighting times counting unit 107 determines that a person has gotten in or off or luggage has loaded or unloaded and performs an addition to the number of times of boarding/alighting s accumulated in the boarding/alighting times accumulating unit 108. In the case where a determination result that an angular variation larger than or equal to the threshold value β has occurred is acquired for a plurality of times during one stationary period of the vehicle, the boarding/alighting times counting unit 107 determines that a plurality of persons has gotten in or off or plurality of pieces of luggage has been loaded or unloaded, and performs addition to the number of times of boarding/alighting s accumulated in the boarding/alighting times accumulating unit 108 for each of the boarding/alighting and the loading and unloading.

Upon receiving a notification that correction to rewrite the vehicle inclination angle θnew to the reference angle θmem from the correction determination processing unit 104a, the boarding/alighting times counting unit 107 resets the value of the number of times of boarding/alighting s accumulated in the boarding/alighting times accumulating unit 108 to "0."

The boarding/alighting times accumulating unit 108 accumulates the number of times of boarding/alighting s.

The correction determination processing unit 104a calculates the threshold value α to be referred to in comparing the vehicle inclination angle θnew and the reference angle θmem on the basis of the number of times of boarding/alighting s accumulated in the boarding/alighting times accumulating unit 108. The correction determination processing unit 104a calculates the threshold value α from Equation (1) below.

$$\alpha = \theta 0 + s \times \theta 1 \quad (1)$$

In Eq. (1), θ0 and θ1 may be any constant.

As expressed in the Eq. (1), the threshold value α increases as the value of the number of times of boarding/alighting s increases. Accordingly, an upper limit value is set for the threshold value α. For example, the upper limit value of the threshold value α is set to 10σ on the basis of the standard deviation σ of the inclination angle.

The correction determination processing unit 104a determines whether an absolute value of a difference between the vehicle inclination angle θnew and the reference angle θmem is less than the threshold value α calculated on the basis of Eq. (1). In the case where the absolute value of the difference between the vehicle inclination angle θnew and the reference angle θmem is less than the threshold value α, the correction determination processing unit 104a performs correction to rewrite the vehicle inclination angle θnew to the reference angle θmem. The correction determination processing unit 104a outputs the corrected reference angle θmem to an inclination angle outputting unit 106 and notifies the boarding/alighting times counting unit 107 that the correction to rewrite to the reference angle θmem has been performed. On the other hand, in the case where it is determined not to correct the vehicle inclination angle θnew, the correction determination processing unit 104a outputs the vehicle inclination angle θnew to the inclination angle outputting unit 106 as it is.

Next, a hardware configuration example of the inclination angle detection apparatus 100A will be described. Note that a diagram illustrating the hardware configuration example of the inclination angle detection apparatus 100A of Embodiment 2 is the same as FIGS. 2A and 2B described in Embodiment 1, and thus illustration thereof is omitted. Description of the same configuration as that of Embodiment 1 is also omitted.

The boarding/alighting times counting unit 107 and the correction determination processing unit 104a in the inclination angle detection apparatus 100A may be implemented by the processing circuit 100a which is dedicated hardware as illustrated in FIG. 2A, or may be implemented by the processor 100b which executes a program stored in a memory 100c as illustrated in FIG. 2B.

Alternatively, as illustrated in FIG. 2B, in the case where the boarding/alighting times counting unit 107 and the correction determination processing unit 104a are implemented by the processor 100b, the functions of the boarding/alighting times counting unit 107 and the correction determination processing unit 104a are implemented by software, firmware, or a combination of software and firmware. Software and firmware are described as a program, which is stored in the memory 100c. The processor 100b reads and executes the program stored in the memory 100c and thereby implements the functions of the boarding/alighting times counting unit 107 and the correction determination processing unit 104a. That is, the boarding/alighting times counting unit 107 and the correction determination processing unit 104a includes the memory 100c for storing a program by which respective steps illustrated in FIG. 8 described later are resultantly executed when executed by the processor 100b. It can also be regarded that this program causes a computer to execute procedures or methods of the boarding/alighting times counting unit 107 and the correction determination processing unit 104a.

Note that part of the functions of the boarding/alighting times counting unit 107 and the correction determination processing unit 104a may be implemented by dedicated hardware with another part thereof implemented by software or firmware. In this manner, the processing circuit 100a in the inclination angle detection apparatus 100A can implement the above functions by hardware, software, firmware, or a combination thereof.

Next, the operation of the inclination angle detection apparatus 100A will be described.

Figure 8A:
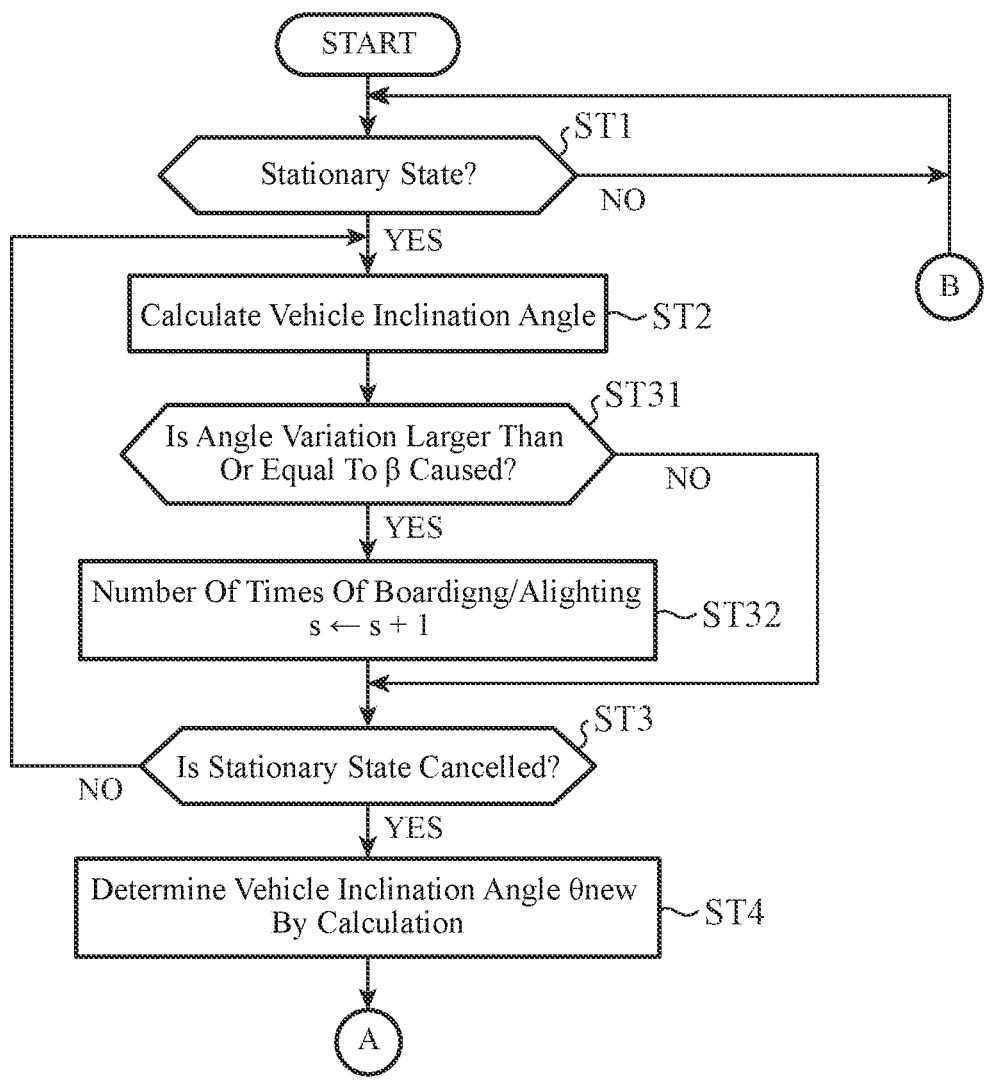
FIG. 8A is a flowchart illustrating the operation of the inclination angle detection apparatus according to Embodiment 2.
Figure 8B:
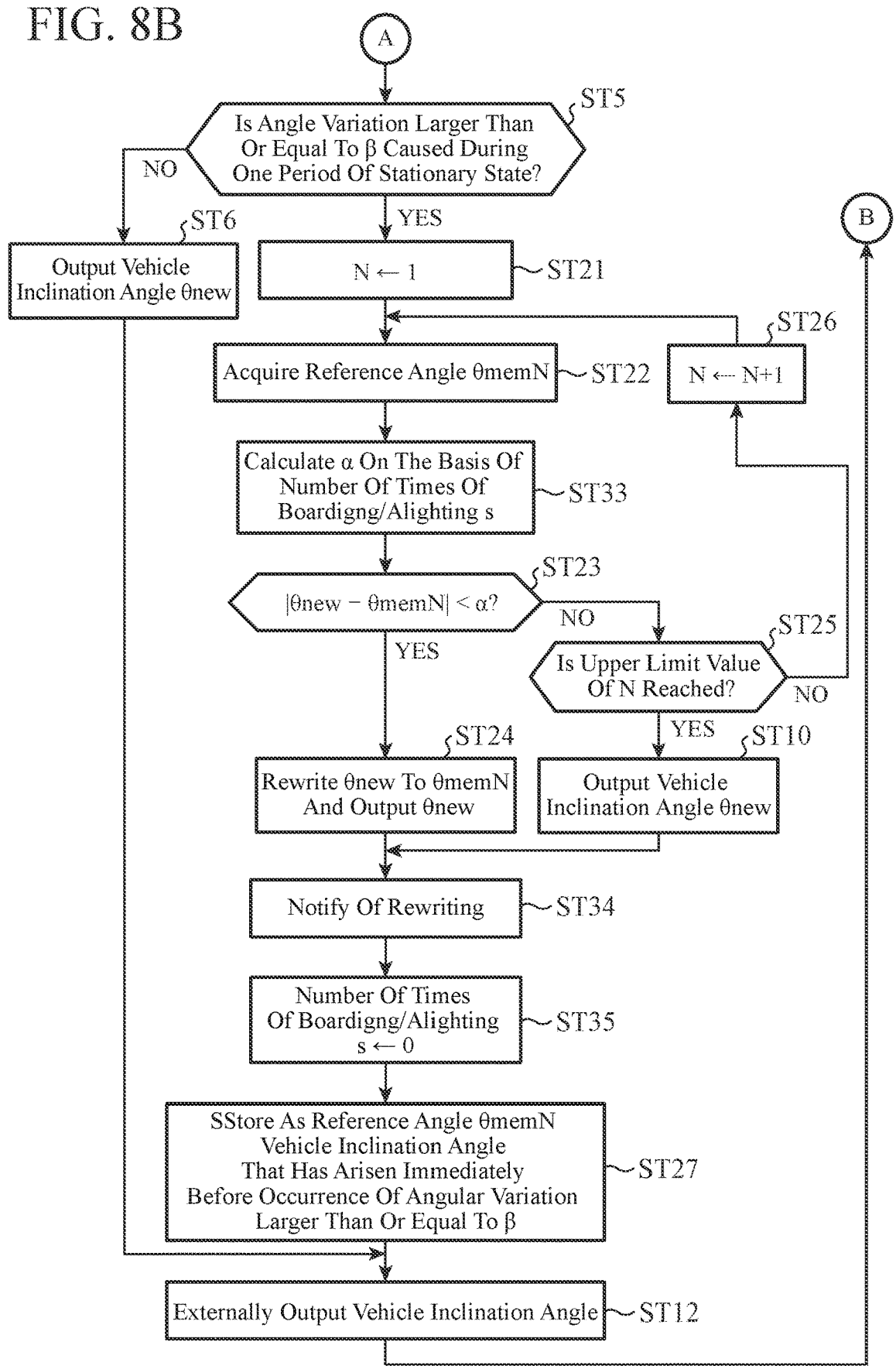
FIG. 8B is a flowchart illustrating the operation of the inclination angle detection apparatus according to Embodiment 2.

FIGS. 8A and 8B are flowcharts illustrating the operation of the inclination angle detection apparatus 100A according to Embodiment 2. In FIGS. 8A and 8B, the same step as that in the flowchart of Embodiment 1 illustrated in FIG. 5 is denoted with the same symbol, and description thereof will be omitted. In the flowcharts of FIG. 8, the case where an inclination angle storing unit 105 of the inclination angle detection apparatus 100A accumulates reference angles θmemN (N=1, 2, 3, . . . ) will be described.

If the inclination angle calculating unit 103 determines that the vehicle is stationary by referring to vehicle information (step ST1; YES), then the inclination angle calculating unit 103 refers to inclination angle information input from the inclination angle information acquiring unit 101 and calculates the inclination angle of the vehicle (step ST2). The inclination angle calculating unit 103 outputs the calculated inclination angle to the boarding/alighting times counting unit 107 and the correction determination processing unit 104a. The boarding/alighting times counting unit 107 refers to the inclination angle input from the inclination angle calculating unit 103 and determines whether an angular variation larger than or equal to the preset threshold value β has occurred (step ST31). If no angular variation larger than or equal to the threshold value β has occurred (step ST31: NO), then the flow proceeds to processing of step ST3.

On the other hand, if an angular variation larger than or equal to the threshold value β has occurred (step ST31: YES), then the boarding/alighting times counting unit 107 adds "1" to the value of the number of times of boarding/alighting s accumulated in the boarding/alighting times accumulating unit 108 (step ST32). The inclination angle calculating unit 103 determines whether the stationary state of the vehicle has been canceled (step ST3). If the stationary state of the vehicle is not canceled (step ST3; NO), then the calculation processing of step ST2 is repeated. On the other hand, if the stationary state of the vehicle is canceled (step ST3; YES), then the inclination angle calculating unit 103 determines the vehicle inclination angle θnew from the inclination angle of the vehicle obtained by the calculation in step ST2 (step ST4). Thereafter, the inclination angle detection apparatus 100A performs the processing of step ST5, step ST21, and step ST22.

When acquiring the reference angle θmemN set in step ST22, the correction determination processing unit 104a calculates the threshold value α on the basis of the number of times of boarding/alighting s accumulated in the boarding/alighting times accumulating unit 108 (step ST33). The correction determination processing unit 104a determines whether an absolute value of a difference between the vehicle inclination angle θnew determined in step ST4 and the reference angle θmemN acquired in step ST22 is less than the threshold value α calculated in step ST33 (step ST23).

If the absolute value of the difference between the vehicle inclination angle θnew and the reference angle θmemN is less than the threshold value α (step ST23; YES), then the correction determination processing unit 104a assumes that a passenger having the same weight as that in a previous stationary period has gotten in or off, and performs correction to rewrite the vehicle inclination angle θnew to the reference angle θmemN and outputs the corrected vehicle inclination angle to the inclination angle outputting unit 106 (step ST24). The correction determination processing unit 104a further notifies the boarding/alighting times counting unit 107 that the correction to rewrite the vehicle inclination angle θnew to the reference angle θmemN has been performed (step ST34). When receiving of the notification in step ST34, the boarding/alighting times counting unit 107 resets the value of the number of times of boarding/alighting s accumulated in the boarding/alighting times accumulating unit 108 to "0" (step ST35).

If the absolute value of the difference between the vehicle inclination angle θnew and the reference angle θmemN is not less than the threshold value α (step ST23; NO), then the correction determination processing unit 104a performs processing of steps ST25 and ST10 or step ST26.

Thereafter, the correction determination processing unit 104a refers to the inclination angle of the vehicle obtained by the calculation processing during one stationary period of the vehicle calculated by the inclination angle calculating unit 103, and accumulates an inclination angle of the vehicle that has arisen immediately before the occurrence of an angular variation larger than or equal to the preset threshold value β in the inclination angle storing unit 105 as a new reference angle θmemN (step ST27). The inclination angle outputting unit 106 outputs the vehicle inclination angle input in step ST24 or step ST10 to the optical axis controlling apparatus 400 (step ST12). Thereafter, the flowchart returns to the processing of step ST1 and the processing described above is repeated.

The processing operation illustrated in the flowcharts of FIGS. 8A and 8B will be described with reference to a specific example of FIG. 9.

Figure 9:
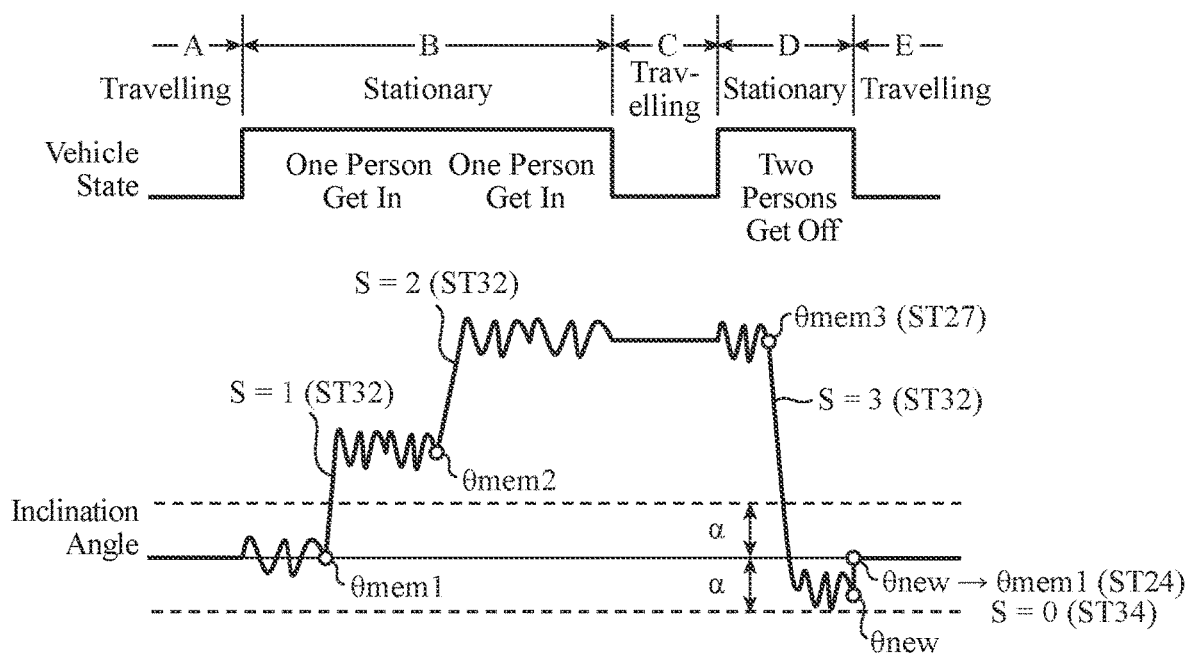
FIG. 9 is a diagram illustrating an example of processing of the inclination angle detection apparatus according to Embodiment 2.

FIG. 9 is a diagram illustrating variations in the vehicle state and the inclination angle of the vehicle acquired by the inclination angle detection apparatus 100A according to Embodiment 2.

The vehicle state indicates that a travel has gone through a travel period A, a stationary period B, a travel period C, a stationary period D, and a travel period E. It is also indicated that one person has gotten in twice in the stationary period B and that two persons have gotten off in the stationary period D.

The case where the processing illustrated in the flowcharts of FIG. 8 is performed for the stationary periods B and D of FIG. 9 will be described. It is assumed that, in the inclination angle storing unit 105, inclination angles immediately before occurrence of an angular variation larger than or equal to the threshold value β in the stationary period B are accumulated as a reference angle θmem1 and a reference angle θmem2. Note that description of the threshold value β is omitted in FIG. 9.

First, the stationary period B will be described.

In step ST1, the inclination angle calculating unit 103 determines that the vehicle is stationary (step ST1; YES), and repeats calculation of inclination angle of the vehicle during the stationary period B in step ST2. The boarding/alighting times counting unit 107 determines that an angular variation larger than or equal to the threshold value β has occurred in step ST31 (step ST31; YES) and adds "1" to a value of the number of times of boarding/alighting s accumulated in the boarding/alighting times accumulating unit 108 in step ST32 to obtain the number of times of boarding/alighting s=1. In step ST3, the inclination angle calculating unit 103 determines that the stationary state of the vehicle has not been cancelled (step ST3; NO), and the flow returns to the processing of step ST2.

Again in step ST2, the inclination angle calculating unit 103 calculates the inclination angle of the vehicle during the stationary period B. The boarding/alighting times counting unit 107 determines that an angular variation larger than or equal to the threshold value β has occurred in step ST31 (step ST31; YES) and adds "1" to a value of the number of times of boarding/alighting s accumulated in the boarding/alighting times accumulating unit 108 in step ST32 to obtain the number of times of boarding/alighting s=2. After transition to the travel period C, the inclination angle calculating unit 103 determines that the stationary state of the vehicle has been canceled in step ST3 (step ST3; YES) and determines, as the vehicle inclination angle θnew, an inclination angle of the vehicle that has arisen immediately before the determination that the stationary state has been canceled in step ST4 (not illustrated in FIG. 9).

The correction determination processing unit 104a determines that an angular variation larger than or equal to the threshold value β has occurred during the stationary period D in step ST5 (step ST5; YES). The correction determination processing unit 104a performs setting of N=1 for the reference angle θmemN in step ST21. The correction determination processing unit 104a performs processing to acquire the reference angle θmem1 accumulated in the inclination angle storing unit 105 in step ST22; however, since no reference angle is accumulated in the inclination angle storing unit 105, it is determined that the absolute value of the difference between the vehicle inclination angle θnew and the reference angle θmem1 is not less than the threshold value α in step ST23 (step ST23; NO).

In step ST25, the correction determination processing unit 104a determines that the current value of N of the reference angle θmemN has reached a preset upper limit value (step ST25; YES). The correction determination processing unit 104a outputs the vehicle inclination angle θnew determined in step ST4 to the inclination angle outputting unit 106 in step ST10. The correction determination processing unit 104a stores, in the inclination angle storing unit 105 as a reference angle θmem1 and a reference angle θmem2, inclination angles θ of the vehicle obtained immediately before occurrence of an angular variation larger than or equal to the threshold value β in the stationary period B in step ST27. In step ST12, the inclination angle outputting unit 106 outputs the vehicle inclination angles to the optical axis controlling apparatus 400.

Next, the stationary period D will be described.

In step ST1, the inclination angle calculating unit 103 determines that the vehicle is stationary (step ST1; YES), and repeats calculation of the inclination angle of the vehicle during the stationary period D in step ST2. The boarding/alighting times counting unit 107 determines that an angular variation larger than or equal to the threshold value β has occurred in step ST31 (step ST31; YES) and adds "1" to a value of the number of times of boarding/alighting s accumulated in the boarding/alighting times accumulating unit 108 to obtain the number of times of boarding/alighting s=3 (step ST32). After transition to the travel period E, the inclination angle calculating unit 103 determines that the stationary state of the vehicle has been canceled in step ST3 (step ST3; YES) and determines, as the vehicle inclination angle θnew, an inclination angle that are obtained immediately before the determination that the stationary state has been canceled in step ST4 (see θnew in FIG. 9).

The correction determination processing unit 104a determines that an angular variation larger than or equal to the threshold value β has occurred during the stationary period D in step ST5 (step ST5; YES). The correction determination processing unit 104a performs setting of N=1 for the reference angle θmemN in step ST21. The correction determination processing unit 104a acquires the reference angle θmem1 stored in the inclination angle storing unit 105 in step ST22. In step ST23, the correction determination processing unit 104a determines that an absolute value of a difference between the vehicle inclination angle θnew and the reference angle θmem1 is less than the threshold value α (step ST23; YES). The correction determination processing unit 104a performs correction to rewrite the vehicle inclination angle θnew to the reference angle θmem1 in step ST24 (see the description of θnew→θmem1 at the boundary between the stationary period D and the travel period E in FIG. 9).

The correction determination processing unit 104a notifies the boarding/alighting times counting unit 107 that the correction to rewrite the vehicle inclination angle θnew to the reference angle θmemN has been performed in step ST34. In step ST35, the boarding/alighting times counting unit 107 resets the value of the number of times of boarding/alighting s accumulated in the boarding/alighting times accumulating unit 108 from "3" to "0" (see the description of S=0 at the boundary between the stationary period D and the travel period E in FIG. 9). The correction determination processing unit 104a stores, in the inclination angle storing unit 105 as a reference angle θmem3, an inclination angle θ of the vehicle obtained immediately before the occurrence of an angular variation larger than or equal to the threshold value β in the stationary period D in step ST27. The inclination angle outputting unit 106 outputs the corrected vehicle inclination angle to the optical axis controlling apparatus 400 in step ST12.

As described above, according to Embodiment 2, it is configured to further include the boarding/alighting times counting unit 107 for referring to the inclination angle of the vehicle calculated by the inclination angle calculating unit 103, measuring the number of times of occurrence of a variation in a load on the vehicle, and resetting the counted number of times in the case where the correction determination processing unit 104a has performed correction to rewrite the vehicle inclination angle to the reference angle, and the correction determination processing unit 104a calculates the first threshold value (threshold value α) on the basis of the number of times counted. Therefore, it is possible to suppress accumulation of noise due to mechanisms of the vehicle as the number of times of boarding/alighting increases and to suppress accumulation of detection errors in the inclination angle of the vehicle.

Moreover, according to Embodiment 2, the boarding/alighting times counting unit 107 counts the number of times an angular variation larger than or equal to the second threshold value (threshold value β) is generated in the inclination angle of the vehicle during a stationary period of the vehicle. Therefore, it is possible to suppress unnecessarily increasing the threshold value α by adding the number of times of boarding/alighting when no person gets in or off nor no luggage is loaded or unloaded.

Furthermore, according to Embodiment 2, the correction determination processing unit 104a increases the first threshold value as the number of times counted by the boarding/alighting times counting unit 107 increases. Therefore, it is possible to set the threshold value α corresponding to detection errors of the inclination sensor 200 accumulated without correction of the vehicle inclination angle.

Note that, Embodiment 2 described above illustrated the case where the configuration, in which the number of times of boarding/alighting of people and loading and unloading of luggage is stored and the aforementioned threshold value α is updated depending on the stored number of times, is added to the configuration, described in the latter part of Embodiment 1, in which the inclination angle storing unit 105 accumulates a plurality of reference angles θmem in a plurality of stationary periods in which angular variations larger than or equal to the threshold value β has occurred. Alternatively, the configuration described in Embodiment 2, in which the number of times of boarding/alighting of people and loading and unloading of luggage is stored and the aforementioned threshold value α is updated depending on the stored number of times, may be added to the configuration, described in the former part of Embodiment 1, in which only one reference angle θmem is accumulated in the inclination angle storing unit 105.

In addition to the above, flexible combinations of the respective embodiments, modifications to any components of the respective embodiments, or omissions of any components in the respective embodiments may be made within the scope of the present invention.

INDUSTRIAL APPLICABILITY

An inclination angle detection apparatus according to the present disclosure is capable of suppressing a detection error in the inclination angle of a vehicle and thus is applicable to an auto levelizer or similar devices to be used for appropriately performing optical axis control of headlights of the vehicle.

REFERENCE SIGNS LIST 100, 100A Inclination angle detection apparatus
101 Inclination angle information acquiring unit
102 Vehicle information acquiring unit
103 Inclination angle calculating unit
104, 104a Correction determination processing unit
105 Inclination angle storing unit
106 Inclination angle outputting unit
107 Boarding/alighting times counting unit
108 Boarding/alighting times accumulating unit
200 Inclination sensor
300 Vehicle sensor
400 Optical axis controlling apparatus

The invention claimed is:
1. An inclination angle detection apparatus, comprising:
processing circuitry to:
calculate, when having determined that a vehicle is stationary by referring to vehicle information indicating a traveling state of the vehicle, an inclination angle of the vehicle with respect to road surface during a stationary period using inclination angle information indicating an inclination angle of the vehicle with respect to road surface, and determine a vehicle inclination angle during the stationary period from the calculated inclination angle of the vehicle; and determine whether an absolute value of a difference between the determined vehicle inclination angle and a reference angle determined previously is less than a first threshold value and, if the absolute value of the difference is less than the first threshold value, perform a correction to rewrite the vehicle inclination angle to the reference angle.

2. The inclination angle detection apparatus according to claim 1, wherein the processing circuitry is further configured to perform the determination of whether the absolute value of the difference between the vehicle inclination angle and the reference angle is less than the first threshold value, if the processing circuitry determines that an angular variation larger than or equal to a second threshold value occurs by referring to the calculated inclination angle of the vehicle within one stationary period of the vehicle.

3. The inclination angle detection apparatus according to claim 1, the processing circuitry is further configured to:

refer to the calculated inclination angle of the vehicle, measure the number of times of occurrence of a variation in load on the vehicle, and reset the counted number of times in a case in which a correction to rewrite the vehicle inclination angle to the reference angle is performed, and calculate the first threshold value on the basis of the counted number of times.

4. The inclination angle detection apparatus according to claim 3, wherein the processing circuitry counts the number of times an angular variation larger than or equal to the second threshold value occurs in the inclination angle of the vehicle during the stationary period of the vehicle.

5. The inclination angle detection apparatus according to claim 3, wherein the processing circuitry increases the first threshold value as the counted number of times increases.

6. The inclination angle detection apparatus according to claim 2, wherein, in a case where an angular variation larger than or equal to the second threshold value occurs in the calculated inclination angle of the vehicle within one stationary period of the vehicle, the processing circuitry stores, as the reference angle, an inclination angle of the vehicle that has arisen immediately before the occurrence of the angular variation larger than or equal to the second threshold value.

7. The inclination angle detection apparatus according to claim 6, wherein the processing circuitry stores the reference angle for a plurality of stationary periods of the vehicle.

8. An auto levelizer, comprising:

the inclination angle detection apparatus according to claim 1; and an optical axis controlling apparatus for adjusting an optical axis of a headlight of the vehicle on a basis of the vehicle inclination angle determined or corrected by the inclination angle detection apparatus.

* * * * *